US006529136B2

(12) United States Patent
Cao et al.

(10) Patent No.: US 6,529,136 B2
(45) Date of Patent: Mar. 4, 2003

(54) GROUP NOTIFICATION SYSTEM AND METHOD FOR IMPLEMENTING AND INDICATING THE PROXIMITY OF INDIVIDUALS OR GROUPS TO OTHER INDIVIDUALS OR GROUPS

(75) Inventors: Kevin Trung Cao, Hamburg (DE); Daniel Alexander Ford, Los Gatos, CA (US); Reiner Kraft, Gilroy, CA (US)

(73) Assignee: International Business Machines Corporation, Armonk, NY (US)

(*) Notice: Subject to any disclaimer, the term of this patent is extended or adjusted under 35 U.S.C. 154(b) by 38 days.

(21) Appl. No.: 09/797,149

(22) Filed: Feb. 28, 2001

(65) Prior Publication Data

US 2003/0020623 A1 Jan. 30, 2003

(51) Int. Cl.[7] ............................................. G08B 21/00
(52) U.S. Cl. .............. 340/686.1; 340/7.46; 340/825.49; 701/213
(58) Field of Search ................................ 340/994, 993, 340/3.52, 825.49, 7.48, 7.49, 7.46; 701/213; 342/357.8, 357.9, 450; 455/456, 457, 518, 519

(56) References Cited

U.S. PATENT DOCUMENTS

| | | | |
|---|---|---|---|
| 5,153,836 A | * 10/1992 | Fraughton et al. | 364/461 |
| 5,422,816 A | 6/1995 | Sprague et al. | 364/449 |
| 5,579,535 A | * 11/1996 | Orlen et al. | 455/33.1 |
| 5,907,293 A | 5/1999 | Tognazzini | 340/903 |
| 5,987,377 A | * 11/1999 | Westerlage et al. | 701/204 |
| 6,317,060 B1 | * 3/2000 | Jones | 340/994 |
| 6,385,461 B1 | * 5/2000 | Raith | 455/518 |
| 6,100,806 A | 8/2000 | Gaukel | 340/573.4 |
| 6,331,825 B1 | * 12/2000 | Ladner et al. | 340/988 |
| 6,353,390 B1 | * 3/2002 | Beri et al. | 340/572.1 |

OTHER PUBLICATIONS

A.C. Huang et al., "Pervasive Computing: What Is It Good For?," copyrighted 1999, pp. 84–91.

* cited by examiner

Primary Examiner—Benjamin C. Lee
Assistant Examiner—Phung Nguyen
(74) Attorney, Agent, or Firm—Samuel A. Kassatly (57) ABSTRACT

A group notification system and associated method that allow particular activities to be executed based on the group dynamics, such as the dynamics of organizing meetings. The system facilitates the availability of knowledge concerning the proximity and direction of movement of individuals, objects, or groups, and whether this information satisfies preset criteria or rules. One such criterion is that the proximity distance of the group members be less than a predetermined threshold range. The threshold range can be adjustable or programmable.

44 Claims, 6 Drawing Sheets

GROUP NOTIFICATION SYSTEM AND METHOD FOR IMPLEMENTING AND INDICATING THE PROXIMITY OF INDIVIDUALS OR GROUPS TO OTHER INDIVIDUALS OR GROUPS

CROSS REFERENCE TO RELATED APPLICATION

This application relates to co-pending patent application, titled "System and Method for Implementing Proximity or Location Driven Activities," Ser. No. 09/796,864, filed concurrently herewith, assigned to the same assignee as the present invention, and which is incorporated herein by reference in its entirety.

FIELD OF THE INVENTION

The present invention relates to the field of location dependent data processing, and particularly to a software system and associated method for use with a Global Positioning System (GPS) or equivalent locator scheme for wireless position tracking of an object or person. More specifically, the system and method permit knowledge exchange of the proximity of individuals, objects, groups of persons, or collection of objects, to each other, and are suited for the implementation of location driven activities and/or location based services.

BACKGROUND OF THE INVENTION

Internet based services and derived e-commerce applications are gaining increasing popularity, leading to the integration of diverse computing and communications devices, such as mobile phones, PDAs, and GPS systems.

Such integration has expanded the need for a new generation of "smart devices", independent electronic, web-oriented, software and technological systems and services. One specific need is for a system that uses proximity and/or locations as a means of facilitating the communication between a user and a computer system, such as a server.

The following publications describe current attempts to use location tracking in various applications, and illustrate background material to help explain the context of the problem addressed by the present invention:

U.S. Pat. No. 5,907,293 to Tognazzini;

U.S. Pat. No. 5,422,816 to Sprague et al.; and

U.S. Pat. No. 6,100,806 to Gaukel.

Current systems do not facilitate the availability of knowledge concerning the proximity of individuals to each other, and the direction of movement of the individuals or objects. This information could be used to determine for example, whether an event, such as a meeting could take place, or whether a group member will be late to the meeting and by how long. Such information could be quite significant for business meetings where timing is critical and individual presence is essential.

However, the problem remains that there exists no mechanism which relates to group dynamics and which permits individuals or groups to make decisions based on information available about the proximity of other individuals or groups. The need for such a mechanism has heretofore remained unsatisfied.

SUMMARY OF THE INVENTION

It is a feature of the present invention to satisfy this need as it relates, for example to group dynamics, such as the dynamics of organizing meetings. This invention facilitates the availability of knowledge concerning the proximity and direction of movement of individuals, and whether this information satisfies preset logical criteria.

The following examples will help illustrate exemplary situations being addressed by the present invention:

(1) The absence of a particular individual can void the significance of the meeting. The meeting should be cancelled or delayed until this individual is present.

(2) The absence of a particular individual is not important and the meeting can proceed regardless.

(3) It is necessary to have a quorum of people present to validate the meeting.

(4) It may be helpful to know the trajectory and direction of movement of the people involved to maximize the use of time of those who are ready to attend the meeting. For example, a meeting of persons A, B, C, and D is going to be delayed since person D is held up in traffic and will take 15 minutes to arrive. Persons A, B, and C can be notified automatically, delaying their effort to be at the meeting at the scheduled time, and allowing them to make better use of their time instead of sitting idle in a conference room.

(5) Client C1, perhaps a company or a group of individuals, belongs to group M. Client C1 wishes to get a notification, only when one or more members of group M are close to it (perhaps closer than 5 km). Based on this information, Client C1 can decide to start the meeting, initiate a conference call, etc.

(6) Client C2 belongs to group M and group N. Client C2 will get a notification when client C1 is closer than 2 km or one of the members of group M is closer than 100 m, or one of the members of group N is closer than 0.5 km.

(7) Client C3 wishes to get a notification only when client C1 is within a range of 0.5 km.

The foregoing and other features of the present invention are realized by a group notification system and method for implementing and indicating the proximity of individuals or groups to other individuals or groups. The system generally comprises two main components: a plurality of user modules that identify the group members (or objects), and one or more group location alert servers.

Each user module communicates with the group location alert server, and includes a GPS interface that receives location information and that periodically sends updated location information to the group location alert server. In addition, the user module receives data from the group location alert server and displays it to the group member. The user module operates under the control of a session manager and transmits the member identifying data to the group location alert server over a WAN interface. The WAN interface supports a wireless connection to the Internet, and allows the user module to exchange information with the group location alert server.

The group location alert server collects information from the various user modules in the field, and sorts, collates, and identifies groupings, locations, users' proximities, and/or users' directions of movement, to identify the information to send to various clients. The group location alert server includes a session manager that acquires the location information of the various users from the various user modules over a WAN interface or from the Internet. The group location alert server notifies a matching module of each user's location, by sending a user identification label to the matching module.

The WAN interface supports the connection to the Internet for the communication and interaction between the group location alert server and the various user modules. The matching module calculates the distance between two users' locations. When the matching module receives a notification from the session manager, it calculates the distance between the current location of the user module and the locations of all the other relevant user modules.

The matching module checks the profile database to identify the group, subgroup, groups, or subgroups to which a specific user belongs. The matching module requests all the identifications of the user modules belonging to the relevant groups from the profile database, which are relevant to a predetermined client. The matching module then calculates the distance between the user modules and compares them to a threshold range. When the calculated distance is less than a predetermined profile threshold, the matching module triggers a notification module to send a message to the client concerning the event status.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE INVENTION

The following definitions and explanations provide background information pertaining to the technical field of the present invention, and are intended to facilitate the understanding of the present invention without limiting its scope:

Server: A software program or a computer that responds to requests from a web browser by returning ("serving") web documents.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

World Wide Web (WWW): An Internet client-server hypertext distributed information retrieval system.

The present group notification system and associated method continuously monitor the location of individuals or objects, based on their group membership, and compare their proximity to each other or to other groups. Rules are applied to determine the suitability of taking actions that are related to the collected proximity information.

Figure 1:
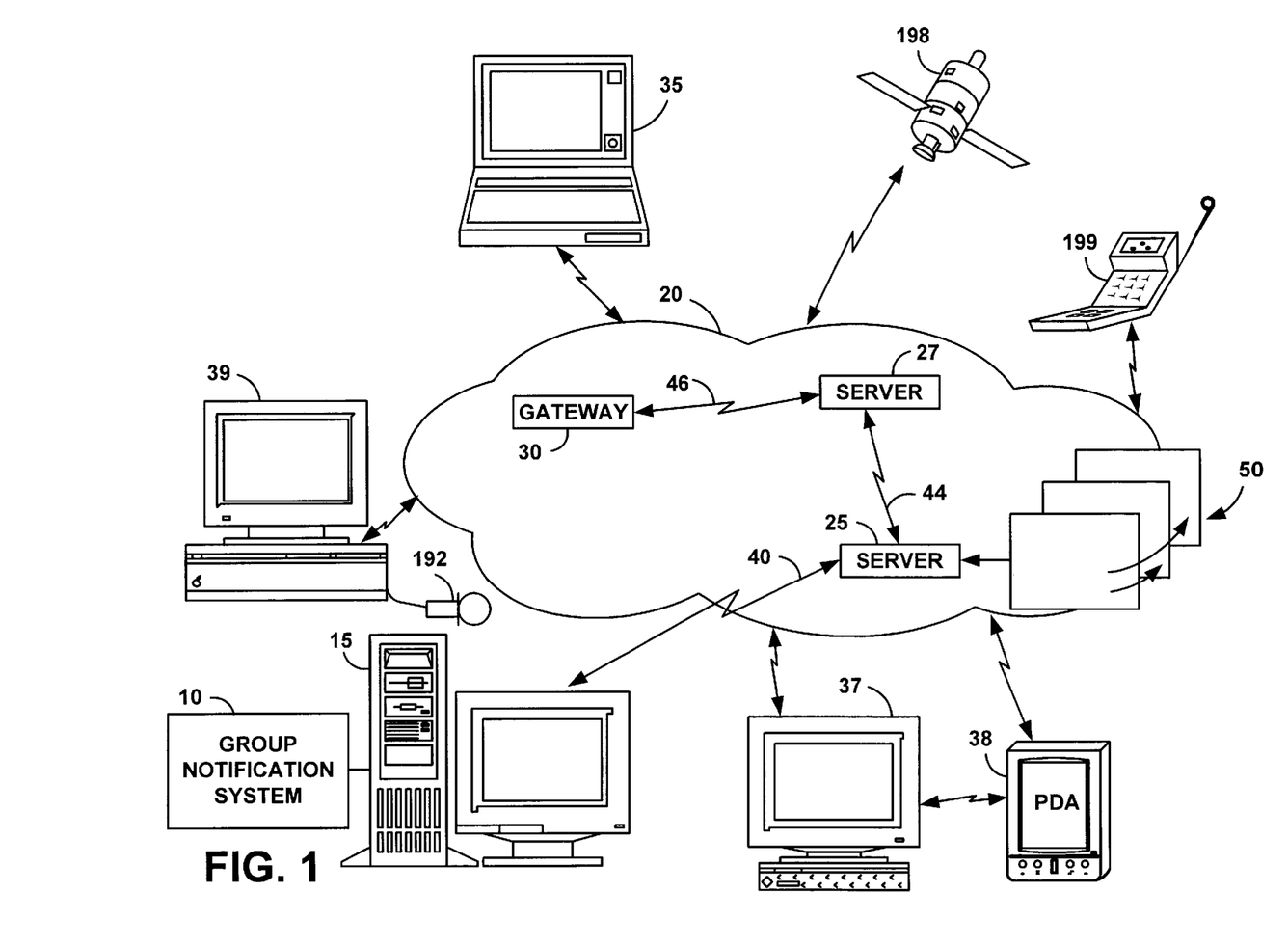
FIG. 1 is a schematic illustration of an exemplary operating environment in which a group notification system of the present invention can be used.

FIG. 1 portrays an overall environment in which a group notification system according to the present invention may be used. The system 10 continuously monitors the locations of users (or objects) and compares their proximity to each other. The proximity information and locations of the group members are maintained by the system 10.

The group notification system 10 includes a software or computer program which is typically embedded within, or installed on, a host server 15. Alternatively, the group notification system 10 can be saved on a suitable storage medium such as a diskette, a CD, a hard drive, or similar devices. Though one host server 15 is illustrated for simplicity of explanation, it should be clear that additional host servers 25, 27 can de dispersed geographically to co-ordinate the reduction of access time from, for example, clients such as 35, 37 and 39.

In addition, while the group notification system 10 will be described in connection with the WWW, it should be clear that the system 10 can also be used with a stand-alone database of computers, servers, gateways, and mobile computing devices for applications that do not need or desire interaction with the WWW.

The cloud-like communication network 20 is comprised of communication lines and switches connecting servers such as servers 25 and 27, to gateways 30. The servers 25 and 27 and the gateway 30 provide the communication access to the WWW. Clients, such as remote Internet sites are represented by a variety of computers 35, 37 and 39 and can query the host server 15 for the desired information. The clients communicate to the servers 25, 27 the information concerning their function, such as their identification, and location.

For clarity purpose, it would be convenient to draw a distinction between a user and a client. A user or group member refers for example to a mobile individual or object. A client refers to an individual, or group of individuals for whom the data concerning the location of the users is being coordinated.

The host server 15 is connected to a network 20 (represented as a cloud to indicate an indeterminate number of connections) via a communications link such as a telephone, cable, or satellite link. The servers 25, 27 can be connected via high speed Internet network lines or links 44 and 46 to other computers and gateways. The servers 25, 27 provide access to stored information such as hypertext or web documents indicated generally at 50. The hypertext documents 50 most likely include embedded hypertext links to other locally stored pages and may also contain information on symbol locations and functions such as timetables, menus, meeting manager applications, etc.

An auxiliary component that could be used as part of the system 10 is represented by a mobile computing unit such as a personal digital assistant (PDA) with a downloadable software application suited to implement the operation of the present invention. A mobile telephone 199 can also be used as a mobile computing unit for the purposes of this invention. The increasing trend to combine personal digital assistants 38 with mobile telephones 199 is expected to facilitate the use of satellite communications to identify the user location with accuracy. A GPS satellite 198 could be used in conjunction with this invention to assist in locating the users and to establish communication between users, clients, servers and gateways.

Figure 2:
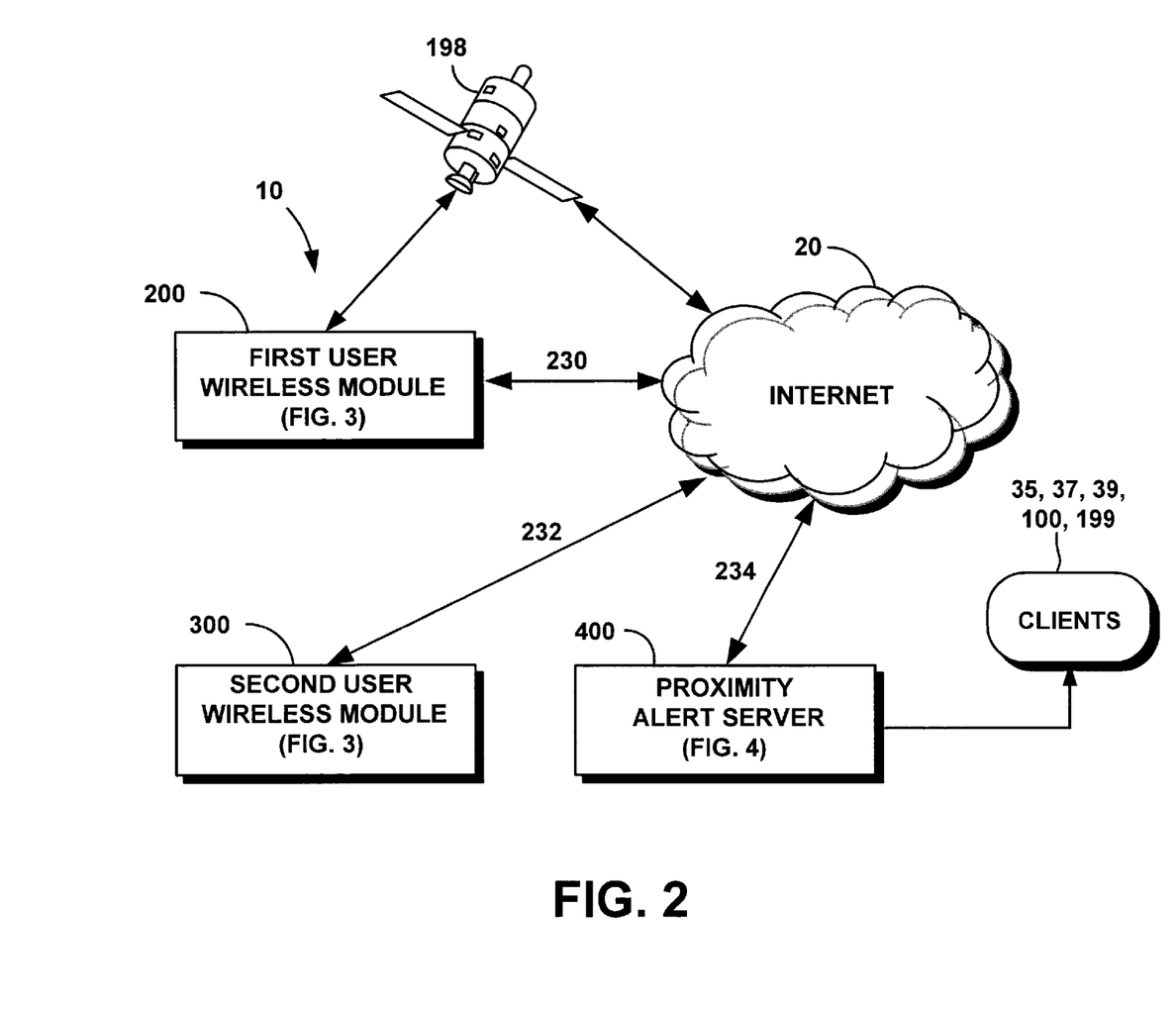
FIG. 2 is a high level diagram illustrating the main components of the group notification system of FIG. 1.
Figure 3:
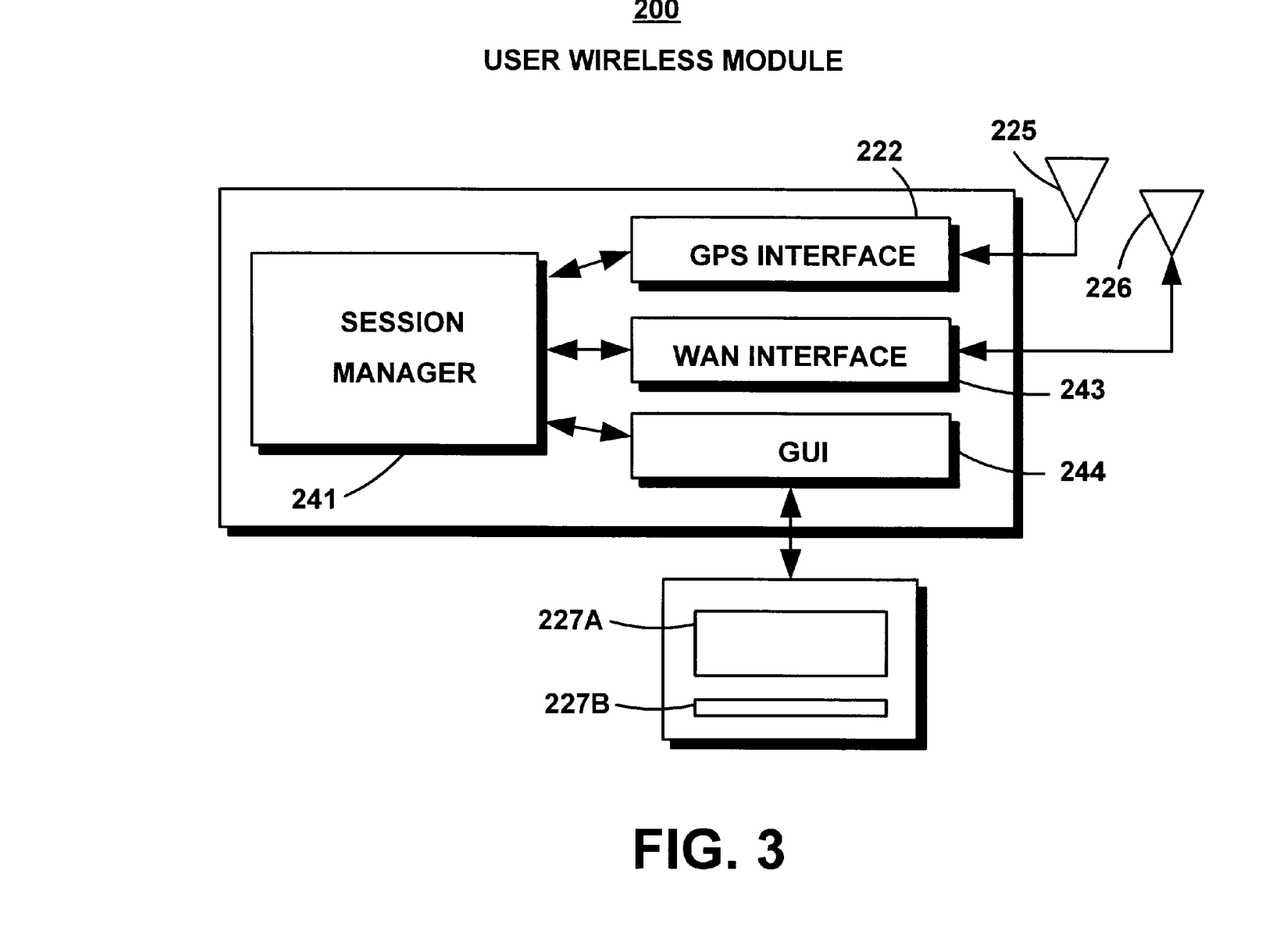
FIG. 3 is a block diagram illustrating the constituent building blocks of an exemplary user wireless module that forms part of the group notification system of FIG. 2.

FIG. 2 represents a high level block diagram of the group notification system 10. The system 10 generally comprises two main components: a plurality of user wireless modules 200, 300, and one or more group location alert servers 400. Since multiple users could be tracked using this system 10, each user is equipped with a personalized user wireless module. These user wireless modules 200, 300 are typically similar in function and design, as illustrated by FIG. 3, and therefore only one representative user wireless module 200 will be described in detail. Each user wireless module 200, 300 has a means for identifying its user to the group location alert server 400.

Referring now to FIG. 3, the user wireless module 200 may be implemented, for example, within a laptop computer, mobile telephone, personal digital assistant (PDA), or integrated in a car system having a wireless wide area network (WAN) connection 243 for communicating with the group location alert server 400. The user wireless module 200 includes a GPS interface 222 that receives location information, such as the current location of the user, and periodically sends updated location information to the group location alert server 400. In addition, the user wireless module 200 receives data from the group location alert server 400 and displays it to the user on a display device 227A.

The user wireless module 200 operates under the control of a session manager 241 which is responsible for the interaction between the various components of the user wireless module 200. It prepares data, such as location, proximity, direction of movement, user ID, etc., and transmits the same to the group location alert server 400 over the WAN interface 243, and/or displays this data over the graphical user interface (GUI) 244 on the display device 227A.

The GPS interface 222 is implemented as a miniaturized GPS receiver that measures the time a radio signal requires to travel from the GPS satellite 198 until it arrives to a GPS antenna 225. By knowing the speed of the radio signal (which is approximately the speed of light), and by timing the moment that each signal is transmitted, the distance to each of the GPS satellites in view can be determined. The final solution of these equations produces an exact position of the GPS antenna 225 in term of latitude and longitude. The GPS receiver interface 222 determines a current location of the user wireless module 222 and supplies its current location to the session manager 241. Modern compact devices for interacting with the GPS satellites 198 and for providing the position data are readily available on the market, and can be attached, for example, to a user's clothing, a PDA 100, or a laptop 35 (FIG. 1) as part of the user wireless module 200.

The WAN interface 243 supports a wireless connection to a computer network, such as the Internet. With this interface, the user wireless module 200 can exchange information with the group location alert server 400. The graphical user interface (GUI) 244 is implemented in the user wireless module 200 to facilitate the system configuration and administration.

The GPS antenna 255 connects to the GPS interface 222 to receive GPS data from the GPS satellite 198. The WAN transceiver antenna 226 is used as a wireless connection. It is coupled to the WAN interface 243 of the user wireless module 200. The output device 227A may be implemented as a display of a wireless device. The input device 227B may be implemented as a touch screen or any other suitable input device, such as a touch screen, keyboard, stylus, microphone combined with voice recognition software, etc.

Figure 4:
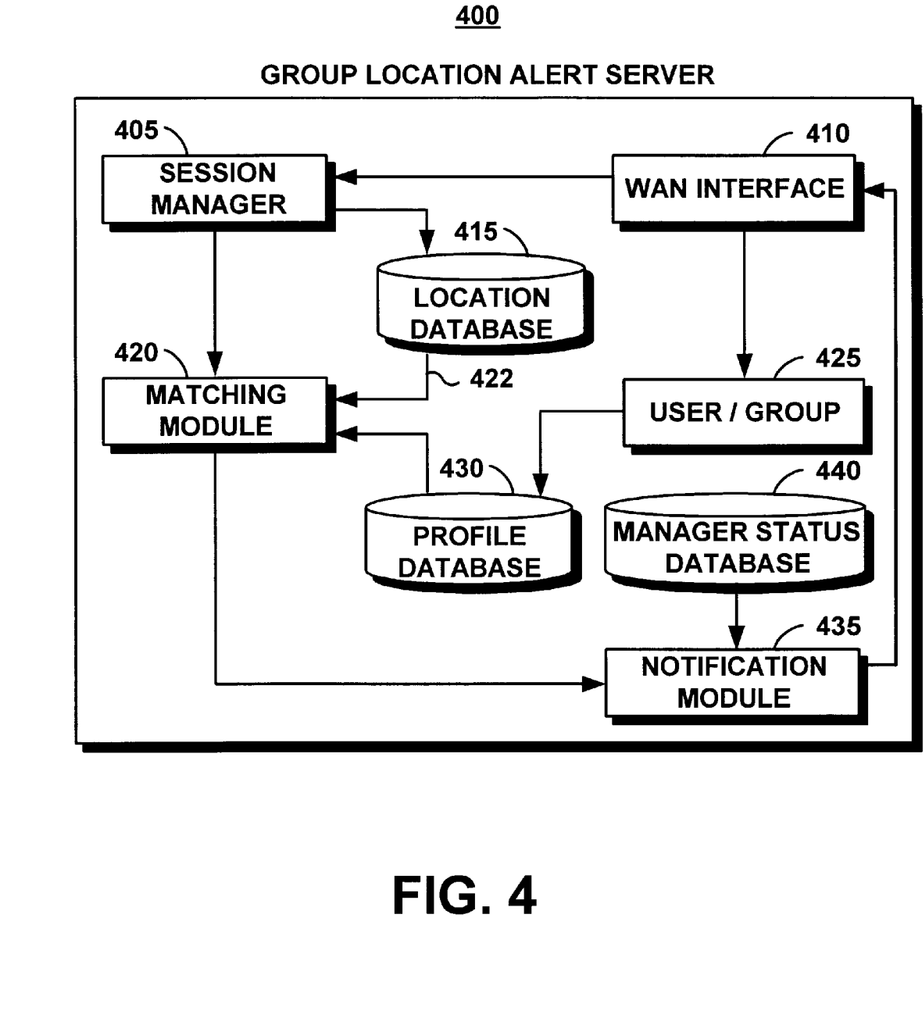
FIG. 4 is a block diagram illustrating the constituent building blocks of an exemplary group location alert server that forms part of the group notification system of FIG. 2.

Wirth reference to FIG. 4, the group location alert server 400 collects information from the various user wireless modules 200, 300 in the field, and sorts, collates, and identifies groupings, locations, users' proximities, and/or users' directions of movement, to identify the information to send to various specific clients 35, 37, 39, 100, 199. The group location alert server 400 notifies a client, a group, or individuals of the proximity of other persons or groups according to the software configuration established for the group or users.

The group location alert server 400 includes a session manager 405 that acquires the location information of the various users from the various user wireless modules 200, 300 over a WAN interface 410 or from the Internet. The group location alert server 400 stores this information in a location database 415 and notifies a matching module 420 of each user's location, by sending a user identification label 422 to the matching module 420.

The WAN interface 410 supports the connection to the Internet for the communication and interaction between the group location alert server 400 and the various user wireless modules 200, 300.

The matching module 420 calculates the distance between two users' locations. When the matching module 420 receives a notification from the session manager 405, it calculates the distance between the current location of the user wireless module 200 and the locations of all the other relevant user wireless modules 300. The relevant user wireless modules 300 may belong to a single client that specifies a plurality of groups or subgroups of users. These relations are specified through client inputs and are stored in a profile database 430 of the group location alert server 400.

The matching module 420 checks the profile database 430 to identify the group, subgroup, groups, or subgroups (collectively referred to as groups) to which a specific user belongs. The matching module 420 requests all the identifications of the user wireless modules 200, 300 belonging to the relevant groups from the profile database 430, which are relevant to a predetermined client.

The matching module 420 then calculates the distance between the user modules 200, 300, compares them to a predetermined threshold range, and stores this information in the location database 415. When the calculated distance is less than a predetermined profile threshold, which could be a distance, a time, or a logical value such as a quorum number, the matching module 420 triggers a notification module 435 to send a message to the client concerning the event status. The location database 415 may also be implemented as a database to store users' locations for calculating the distance between two or more user wireless modules 200, 300.

The profile database (also referred to as definition table) 430 contains information about which group a user wireless module 200 belongs, the proximity range, or threshold, for which a user wireless module 200, 300 will trigger a notification to the client. Furthermore, the profile database 430 contains a reference location 240 for other clients.

Exemplary situations of how the system 10 may be used are as follows, with further reference to FIG. 1:

A first client 35 is interested in being notified if the user or user wireless module 200 is within 2 km from a reference point of 50°34'N 45°13'E.

A second client 37 is interested in being notified if the user or user wireless module 200 is within 0.5 km from a reference point of 10°22'S 16°59'W.

The third client 39 is interested in being notified if the user or user wireless module 200 is within 0.75 km of the or user wireless module 300.

The fourth client 15 is interested in being notified if the users or user wireless modules 200, 300 are within 1.0 km of a reference point, the New York City Library on Fifth Avenue. The group location alert server 400 is provided with means for identifying the location of the library.

The fifth client 100 is interested in being notified if either user or user wireless module 200 or 300 is within 1.0 km of a reference point, New York City Library on Fifth Avenue.

The sixth client 199 is interested in being notified if a certain group (M) of users, or a plurality of user wireless module 200 or 300, are simultaneously within 200 meters of a reference point, such as meeting room 121 in Building 2576.

The seventh client (not shown) is interested in being notified if a group (N) of users, or a plurality of user wireless module 200 or 300, are within 1 mile of the reference point, meeting room 121 in Building 2576.

The eight client (also not shown) is interested in being notified if the users of groups (M) and (N) are within 100 meters of the reference point, meeting room 121 in Building 2576.

In all cases, when the trigger event occurs, a notification is sent from notification module 435 of FIG. 4, to the client, by various communications means, including but not limited to email, fax, pager, phone call, or another suitable technique of choice. Updates of a specified regularity are also sent to the client. Ancillary information can be added to the transmission to the client concerning time, moving direction towards or away from the reference point, estimated time of arrival, and so forth, depending on the frequency of the updates, and the desirability of the information for the client.

The notification module 435 is triggered by the matching module 420. The transmitted information concerning specific users is stored in a status database 440, and compared to incoming data from the matching module 420. No data is sent if changes have not occurred in the status of the users.

A user/group manager 425 manages the profile database 430. It updates the records for the user. The user may have permission to set his or her profile over the Internet using his or her user wireless module 200. Alternatively, only a system administrator of the group location alert server 400, with an executive privilege, may change the profile database 430 containing information about the clients and the user wireless modules 200, 300.

The matching module 420 performs a calculation to determine the distance between various user wireless modules 200, 300 and predetermined reference points when prompted by the session manager 405. The distance is calculated using data from the GPS derived location data of the user wireless modules 200, 300. The following is a mathematical formula for calculating the distance between any two points given their latitude and longitude in degrees, which can be used to determine the distances to be compared to the threshold ranges. This latitude and longitude information may be derived from GPS data in the system 10.

Lat1=Latitude of first position (degrees)
Lat2=Latitude of second position (degrees)
Long1=Longitude of first position (degrees)
Long2=Longitude of second position (degrees)

$$\text{Distance (kms)}=1.852*60*\text{ArcCos}(\text{SIN}(\text{Lat1})*\text{SIN}(\text{Lat2})+\text{COS}(\text{Lat1})*\text{COS}(\text{Lat2})*\text{COS}(\text{Long2}-\text{Long1}))).$$

While the present system 10 has been described in relation to two users or user wireless modules 200, 300, it should be clear that the system 10 can also be used to provide the desired service to a much larger group of users (FIG. 5) that are collectively referenced by group 800. In the situation of a group of users 800 wishing to meet, each of the users is provided with his or her own user mobile computing device 200A, 200B, 200C, 200D, etc. that interact with the group location alert server 400 as described earlier in connection with the user wireless modules 200. However, in the example of a group attendance, the group location alert server 400 triggers or initiates the desired application or business transaction, once all the group members 200A, 200B, 200C, 200D are within a desired proximity distance or range.

Figure 5:
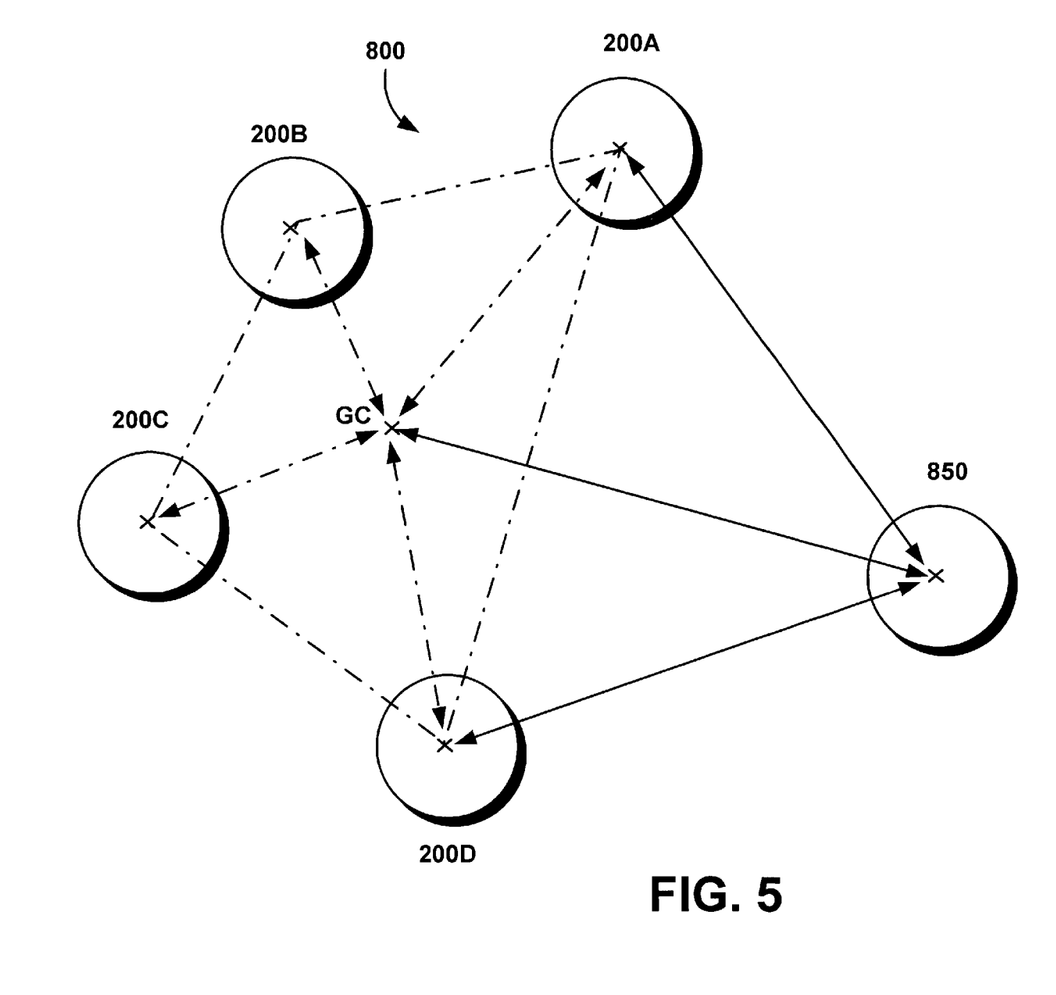
FIG. 5 is a block diagram illustrating the use of the group notification system of FIG. 2 by a group of users.

The proximity distance or range of the group members can be defined in numerous way, some of which are enumerated below:

1. The proximity is the distance between two or more group members, such as the distance between user 200A and user 200D (shown in dashed line).
2. The proximity is the distance between the majority, or all the members of group 800 (shown in dashed lines).
3. The proximity is the distance between the majority, or all the members of group 800 and a dynamic geometric center (GC) formed by interpolating the positions of all or the majority of the group members.
4. The proximity between one group 800 and another group (or user) 850 is the distance between group (or user) 850, and either (1) one or more members (i.e., 200A, 200D) of group 800 or (2) the dynamic geometric center GC of group 800 (shown in solid lines).

Figure 6:
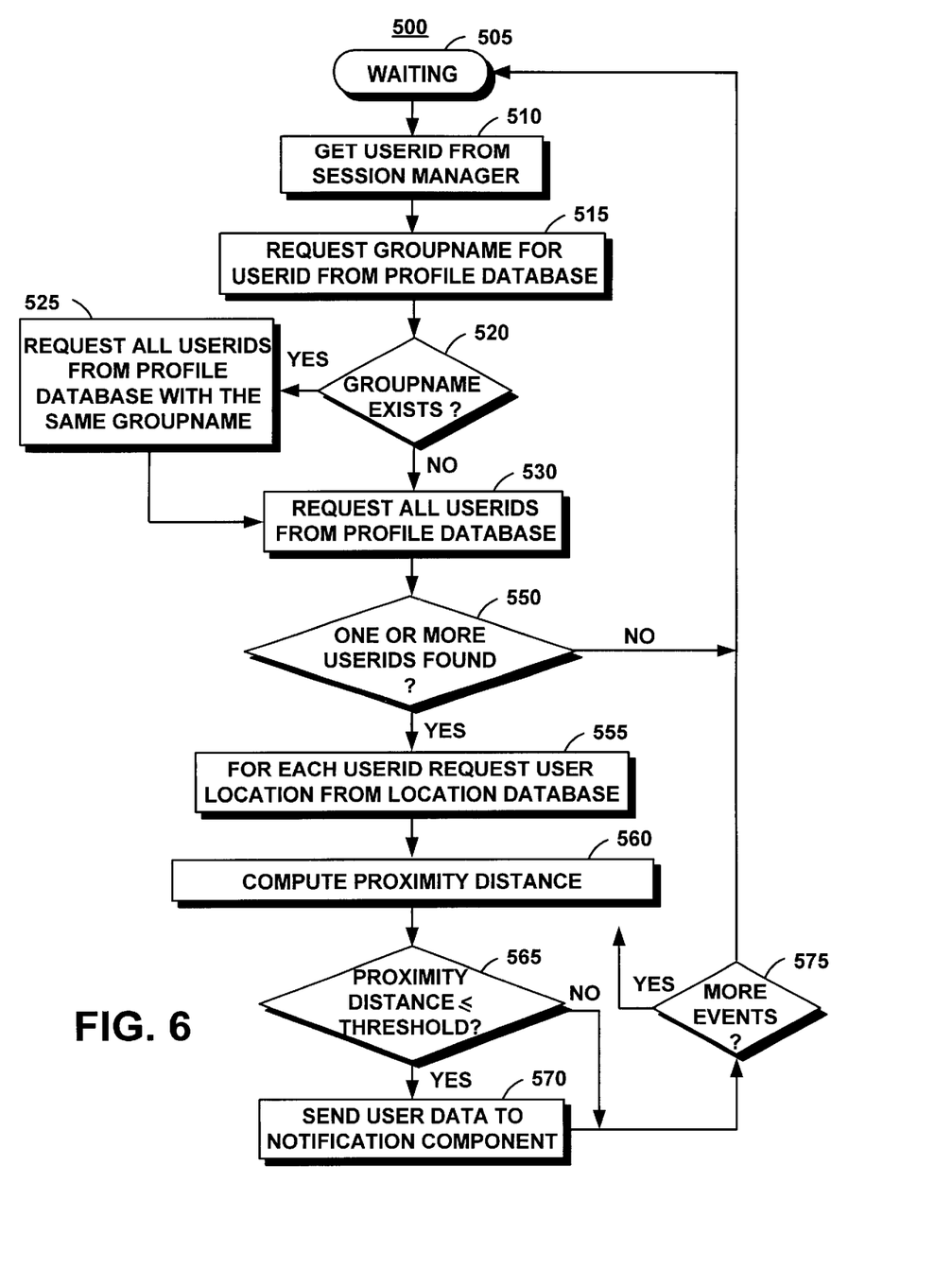
FIG. 6 is a flow chart representing an overall method of operation of the group notification system of FIG. 2.

Referring now to FIG. 6, it illustrates the overall method of operation 500 of the group notification system 10. With further reference to FIG. 2, the method 500 starts at step 505 by having the session manager 405 idle in a wait mode, either for a data input from the user wireless modules 200, 300, or for a request from a client for data about a group of users.

Once data is received from a user wireless module 200, the matching module 420 retrieves the user identification data (userid) from the received data, at step 510. Using the retrieved userid, the matching module 420 requests, at step 515, the name of the group (groupname) to which this user wireless module 200 belongs.

The method 500 then inquires at decision step 520 if there exists a groupname for the user wireless module 200. If it does, the session manager 405 retrieves the corresponding groupname at step 525, and extracts all the userids of the groupname from the profile database 430. The method 500 then proceeds to step 530 where the user identification information (userid) and the group information (groupname) are used to identify the "relevant users" or relevant user wireless modules 200, 300 to track for a particular event. Reconsidering decision step 520, if the method 500 did not locate a groupname for the user wireless module 200, it proceeds directly to step 530.

From step 530, the method 500 proceeds to decision step 550 where it inquires if one or more userids resulted from the request at step 550. If no relevant users (identified by the userids) are found at step 550, the method 500 returns to an idle state at step 505.

On the other hand, if one of more relevant userids are found at step 505, the method 500 proceeds to step 555 where it requests the user location coordinates for each userid, from the location database 415. The method 500 then calculates, at step 560, the proximity distance of the relevant user wireless modules 200, 300, as discussed earlier in connection with FIG. 5. If the users' locations change during the calculation process, then the method 500 recalculates the proximity threshold, and proceeds to decision step 565.

At decision step 565, method 500 determines if the proximity distance which was measured or calculated at step 560 is less than, or equal to a predetermined threshold value. If this condition is satisfied, method 500 sends the user data, such as location, proximity, direction of movement, user ID, etc., to the notification module 435. In turn, the notification module 435 notifies the client concerning the status of the relevant user wireless module 200, such as the estimated time of arrival, as described earlier.

In addition, method 500 proceeds to decision step 575 and checks for the occurrence of additional events that might influence or affect the determination at decision step 565. If any such additional event exists, such as when the user location has changed, method 500 returns to step 560, recalculates the distance between the reference location and the new user location, and repeats steps 565, 570, and 575, until it determines, at step 565 that the user distance exceeds the threshold value.

If at step 565, method 500 determines that the proximity distance exceeds the threshold value, it proceeds to decision step 575 and the matching module 420 makes the inquiry described earlier. The matching module 420 sends the user data to the notification module 435. In turn, the notification module 435 notifies the client concerning the status of the relevant user wireless module 200, such as a message to the effect that the "user is out of range."

If method 500 determines at step 575 that it has covered all potential occurrences or events, it proceeds to the idle state at step 505.

It is to be understood that the specific embodiments of the present invention have been described as being merely illustrative of certain possible applications of the group notification system and method described herein. Numerous modifications may be made to the system and method without departing from the spirit and scope of the present invention. For example, while the communication between the components of the system 10 has been described in terms of a GPS system, it should be understood that other physical locations retriever systems, including but not limited to wireless networks, could alternatively be used. One such communication and identification system is described in a U.S. application titled "System and Method for Providing Time-limited Access to People, Objects and Services", Ser. No. 09/672,360, which was filed on Sep. 28, 2000 and assigned to the same assignee as the present invention, and which is incorporated herein by reference in its entirety.

What is claimed is:

1. A method of implementing a group proximity driven activity, comprising:
   identifying the group and members of the group;
   specifying an activity to be implemented by the group;
   calculating a proximity center of the group;
   determining a proximity range of the group that corresponds to the activity;
   identifying an executable code corresponding to the activity;
   determining a current location of at least one member of the group relative to the proximity center;
   determining whether the current location is within the proximity range; and
   executing the executable code if the current location is within the proximity range.

2. The method according to claim 1, further comprising transmitting the current location to a group location alert server.

3. The method according to claim 2, wherein transmitting the current location comprises transmitting over a network.

4. The method according to claim 3, wherein transmitting over the network comprises transmitting over the Internet.

5. The method according to claim 2, further comprising downloading a software code from the group location alert server to a user module.

6. The method according to claim 5, further comprising executing the software code on the user module.

7. The method according to claim 2, wherein executing comprises executing the executable code on the group location alert server.

8. The method according to claim 1, wherein determining the current location comprises using a GPS coordinate frame.

9. The method according to claim 1, further comprising defining the proximity range of the group as a distance between two or more group members.

10. The method according to claim 1, wherein defining the proximity range of the group comprises defining the distance between two groups.

11. The method according to claim 1, further comprising defining the proximity range of the group as a distance between a majority of group members.

12. The method according to claim 11 further comprising defining the proximity range of the group as a distance between the majority of the group members and the proximity center of the group.

13. The method according to claim 12, wherein the group proximity center is a geometric center formed by interpolating the positions of the majority of the group members.

14. The method according to claim 13, wherein the geometric center is formed by interpolating the positions of the predetermined number of group members.

15. The method according to claim 14, further comprising defining the proximity range of the group as a distance between the proximity center of the group and a proximity center of another group.

16. The method according to claim 1, further comprising defining the proximity range of the group as a distance between all members of the group.

17. The method according to claim 1, further comprising defining the proximity range of the group as a distance between all members of the group and the proximity center.

18. The method according to claim 17, wherein the predetermined number of group members is a majority of the group members.

19. The method according to claim 17, wherein the predetermined number of group members includes all the group members.

20. The method according to claim 1, further comprising defining the proximity range of the group as a distance between the group and a group member.

21. The method according to claim 1, wherein the proximity center is dynamic.

22. The method according to claim 21, wherein the proximity center changes with movement of the group members.

23. The method according to claim 21, further comprising determining a direction of movement of a group member.

24. The method according to claim 23, further determining a trajectory of movement of the group member.

25. The method according to claim 24, wherein executing the executable code is based on the trajectory and direction of movement of the group member.

26. The method according to claim 21, further comprising determining if a predetermined number of group members is outside the proximity range.

27. The method according to claim 26, wherein if the predetermined number of group members is outside the proximity range, providing a notification to group members that are within the proximity range.

28. The method according to claim 26, further comprising determining a direction of movement of group members that are outside the proximity range.

29. The method according to claim 28, further determining a trajectory of movement of the group members that are outside the proximity range.

30. A computer program product for implementing a group proximity driven activity, comprising:
   a group location alert server for identifying the group and members of the group; for specifying the activity to be implemented by the group; for determining a proximity center and a proximity range of the group that correspond to the activity; for identifying an executable code corresponding to the activity; and for determining a current location of at least one member of the group relative to the proximity center; and
   the event proximity server determining whether the current location is within the proximity range, and executing the executable code if the location is within the proximity range.

31. The system according to claim 30, wherein the proximity center is dynamic.

32. The system according to claim 30, wherein the group members and the group location alert server communicate over a network.

33. The system according to claim 32, wherein the group location alert server downloads a software code to a user module of a group member.

34. The system according to claim 33, wherein the user module executes the software code when a proximity condition is satisfied.

35. The system according to claim 33, wherein the user module includes any one or more of: a personal computer, a personal digital assistant, or a cellular telephone.

36. The system according to claim 30, wherein the proximity range is any one or more of:
   a distance between two or more group members;
   a distance between a majority, or all the group members;
   a distance between the majority or all the group members, and the proximity center; and
   a distance between one group and another group or user.

37. A system for implementing a proximity driven activity, comprising:
   a group location alert server for identifying the group and members of the group; for specifying the activity to be implemented by the group; for determining a proximity center and a proximity range of the group that correspond to the activity; for identifying an executable code corresponding to the activity; and for determining a current location of at least one member of the group relative to the proximity center; and
   the event proximity server determining whether the current location is within the proximity range, and executing the executable code if the location is within the proximity range.

38. The system according to claim 37, wherein the proximity center is dynamic.

39. The system according to claim 37, wherein the group members and the group location alert server communicate over a network.

40. The system according to claim 39, wherein the network includes the Internet.

41. The system according to claim 39, wherein the group location alert server downloads a software code to a user module of a group member.

42. The system according to claim 41, wherein the user module executes the software code when a proximity condition is satisfied.

43. The system according to claim 41, wherein the user module includes any one or more of: a personal computer, a personal digital assistant, or a cellular telephone.

44. The system according to claim 37, wherein the proximity range is any one or more of:
   a distance between two or more group members;
   a distance between a majority, or all the group members;
   a distance between the majority or all the group members, and the proximity center; and
   a distance between one group and another group or user.

* * * * *